(12) United States Patent
Zollars et al.

(10) Patent No.: US 6,903,519 B2
(45) Date of Patent: Jun. 7, 2005

(54) MULTI-ELEMENT FIELD EMISSION CATHODE

(75) Inventors: Byron G. Zollars, Georgetown, TX (US); John J. Lorr, Austin, TX (US); Kent R. Kalar, Austin, TX (US)

(73) Assignee: Trepton Research Group, Inc., Santa Clara, CA (US)

( * ) Notice: Subject to any disclaimer, the term of this patent is extended or adjusted under 35 U.S.C. 154(b) by 0 days.

(21) Appl. No.: 10/628,775

(22) Filed: Jul. 28, 2003

(65) Prior Publication Data

US 2004/0017143 A1 Jan. 29, 2004

Related U.S. Application Data

(62) Division of application No. 09/873,660, filed on Jun. 4, 2001, now Pat. No. 6,624,578.

(51) Int. Cl.[7] .................................................. G09G 1/04
(52) U.S. Cl. ........................ 315/379; 315/381; 313/415; 313/414
(58) Field of Search ................................ 315/379, 381, 315/382, 369; 313/415, 414, 411

(56) References Cited

U.S. PATENT DOCUMENTS

| | | |
|---|---|---|
| 3,798,478 A | 3/1974 | Say .......................... 313/70 R |
| 3,939,486 A | 2/1976 | Tomii .......................... 358/46 |
| 3,943,281 A | 3/1976 | Keller et al. ............. 178/7.5 D |
| 4,091,332 A | 5/1978 | Crandall ...................... 330/43 |
| 4,178,531 A | 12/1979 | Alig ........................... 313/409 |
| 4,259,610 A | 3/1981 | Takanashi et al. ........... 313/417 |
| 4,361,781 A | 11/1982 | Depp et al. .................. 313/409 |
| 4,616,160 A | 10/1986 | Holtey et al. ................ 315/365 |
| 4,633,142 A | 12/1986 | Marshall ..................... 315/365 |
| 4,633,244 A | 12/1986 | Holtey et al. ................ 340/736 |
| 4,954,901 A | 9/1990 | Okada et al. ................ 358/242 |
| 5,313,231 A | 5/1994 | Yin et al. .................... 345/199 |
| 5,350,978 A | 9/1994 | Chen ...................... 315/368.15 |
| 5,359,266 A | 10/1994 | Smith et al. ................. 315/383 |
| 5,382,883 A | 1/1995 | Chen et al. ............. 315/368.15 |
| 5,389,855 A | 2/1995 | Chen ........................... 315/14 |

(Continued)

FOREIGN PATENT DOCUMENTS

| | | | |
|---|---|---|---|
| EP | 0 959 148 A2 | 11/1999 | ........... C23C/16/00 |
| EP | 1 063 668 A2 | 6/2000 | ............ H01J/1/142 |
| EP | 1 061 548 A2 | 12/2000 | ............ H01J/29/86 |
| EP | 0 967 844 A1 | 1/2002 | ........... C23C/16/26 |
| WO | WO 00/10190 A2 | 2/2000 | ............. H01J/1/30 |

OTHER PUBLICATIONS

Patent Abstracts of Japan, vol. 007, No. 103 (E–173), May 6, 1983 & JP 58 023152 A (Sony KK), Feb. 10, 1983 Abstract.

(Continued)

*Primary Examiner*—Tuyet Thi Vo
(74) *Attorney, Agent, or Firm*—Martine Penilla & Gencarella, LLP

(57) ABSTRACT

Apparatus and method are provided for using a multi-element field emission cathode in a color cathode ray tube. The field emission cathode may have from four to ten field emission arrays linearly arranged. The arrays are preferably formed from carbon-based material. An electron gun assembly focuses electron beams from each array on to a phosphor stripe or dot on the screen of the cathode ray tube. Deflection apparatus moves the beam from each field emission array according to clock signals. Clock signals also turn on or turn off voltage to contacts controlling electron current from the array. Values of voltage applied, determined by a video signal, determine the intensity of electron current from each array, which controls the intensity of the light emitted by each color stripe or dot of phosphor on the phosphor screen.

11 Claims, 6 Drawing Sheets

U.S. PATENT DOCUMENTS

| | | | |
|---|---|---|---|
| 5,439,753 A | 8/1995 | Rogers | 428/688 |
| 5,483,128 A | 1/1996 | Chen | 315/382 |
| 5,543,680 A | 8/1996 | Tomihari | 313/336 |
| 5,557,334 A | 9/1996 | Legate | 348/473 |
| 5,557,344 A | 9/1996 | Chen | 348/809 |
| 5,585,691 A | 12/1996 | Washburn | 313/452 |
| 5,689,158 A | 11/1997 | Chen | 315/382.1 |
| 5,786,669 A | 7/1998 | Kobori et al. | 315/169.3 |
| 5,869,924 A | 2/1999 | Kim | 313/495 |
| 5,916,005 A | 6/1999 | Baik et al. | 445/51 |
| 5,965,977 A | 10/1999 | Makishima | 313/495 |
| 6,054,801 A | 4/2000 | Hunt et al. | 313/311 |
| 6,071,657 A | 6/2000 | Kusunoki et al. | 430/28 |
| 6,181,055 B1 | 1/2001 | Patterson et al. | 313/310 |
| 6,329,745 B2 | 12/2001 | Patterson et al. | 313/310 |
| 6,373,182 B1 | 4/2002 | Kloba et al. | 313/446 |
| 6,441,550 B1 | 8/2002 | Patterson et al. | 313/495 |
| 6,469,433 B1 | 10/2002 | Schueller et al. | 313/446 |

OTHER PUBLICATIONS http://www.pctechguide.com/06crtmon.htm.

*Video Engineering*, A. Luther et al., McGraw–Hill Publishers, "Distortion Correction Circuits," Electron Optics and Deflection, Chapter 5.4, pp. 5–39–5–45.

MULTI-ELEMENT FIELD EMISSION CATHODE

CROSS-REFERENCE TO RELATED APPLICATIONS

This application is a division of U.S. patent application Ser. No. 09/873,660, (U.S. Patent No. 6,624,578) entitled "Cathode Ray Tube Having Multiple Field Emission Cathodes" by Byron G. Zollars, John J. Lorr, and Kent R. Kalar, which was filed on Jun. 4, 2001, and which is incorporated herein by reference in its entirety for all purposes. This application is also related to U.S. patent application Ser. No. 10/628,838, entitled "Method for Forming an Image on a Screen of a Cathode Ray Tube," by Byron G. Zollars and John J. Lorr, and to U.S. Pat. No. 6,833,679, entitled "Method and System for Controlling Electron Beams from Field Emission Cathodes" by Byron G. Zollars, both of which are being filed contemporaneously with the present application on Jul. 28, 2003, and which are incorporated herein by reference in their entirety for all purposes.

BACKGROUND OF THE INVENTION TECHNOLOGY

1. Field of the Invention

This invention relates to cathode ray tubes. More particularly, the invention relates to an array of independently modulated electron beams emanating from field emission cathodes in a cathode ray tube.

2. Description of Related Art

Higher brightness and simpler construction have long been the goal of manufacturers of cathode ray tubes ("CRTs"). In commercial CRTs, brightness is limited by the electron gun current that can be extracted from a thermionic cathode and passed through a small aperture. The small aperture is required to restrict the electron source size and produce a small spot of light on a phosphor screen.

Another limitation on brightness of cathode ray tubes arises from the use of a shadow mask. The shadow mask is effectively a limiting aperture for the electron beam near the plane of the CRT screen. It normally captures from about 30 to 80 percent of the incident electron beam and reduces image brightness by a corresponding amount. Elimination of the shadow mask could regain this lost electron beam current and thereby increase image brightness. Elimination of the shadow mask would also reduce complexity of CRT manufacturing and thereby reduce cost.

Replacing the thermionic oxide cathode with a field emission (FE) cathode can increase electron current and brightness because the FE cathode can deliver a higher current density per unit area. Use of carbon-based FE cathodes in electron guns of CRTs has been disclosed in commonly assigned and co-pending application U.S. Ser. No. 09/169,908, filed Oct. 12, 1998 and in U.S. Pat. No. 6,181,055B1, which are hereby incorporated by reference herein. Still, even with a FE cathode, a brightness increase by a factor of two or three above an oxide cathode CRT is about the limit of achievability. This limitation is primarily caused by excessive space charge and phosphor power-dissipation limitations.

There is a significant quantity of prior art relating to multiple electron beams in CRTs. Most of the prior art is meant for use with thermionic cathodes. For example, U.S. Pat. Nos. 3,943,281, 4,954,901 and 5,557,344 disclose multiple-beam, multiple-raster CRTs that have a plurality of controllable cathodes that are oriented vertically. Each beam is directed to scan a separate scan line and is separately modulated, so that the horizontal scan rate can be reduced by a factor equal to the number of beams. This results in increased frame brightness. These patents all disclose a system requiring a shadow mask. U.S. Pat. No. 5,585,691 describes a method for changing video signal timing in order to provide dynamic color separation and remove the need for a shadow mask in a CRT. The method uses complicated electronics and is limited to specific applications.

There is a need for improved apparatus and method for increasing the brightness, obtaining better spot resolution, allowing instantaneous electronic beam turn-on and eliminating the requirement for a shadow mask in cathode ray tubes. Reductions in complexity and cost of manufacturing are also needed.

SUMMARY OF THE INVENTION

Toward providing these and other advantages, apparatus and method are provided for a cathode ray tube having a field emission cathode and eliminating the requirement for a shadow mask.

In one embodiment, a cathode ray tube having a multi-element cathode is provided. The multi-element cathode has several arrays of field emission cathodes aligned on a common carrier assembly. The arrays are preferably formed from carbon-based material. An electron gun focuses the electron beam from each array on to the phosphor screen of the cathode ray tube.

In another embodiment, a multi-element cathode is provided. In yet another embodiment, method for forming an image on the screen of a cathode ray tube using a multi-element field emission cathode is provided. An electronic circuit to allow scanning electron beams to form an image is also provided.

BRIEF DESCRIPTION OF THE DRAWINGS

For a more complete understanding of the invention and the advantages thereof, reference is now made to the following description taken in conjunction with the following drawings in which like reference numbers indicate like features and wherein.

DETAILED DESCRIPTION OF SPECIFIC EMBODIMENTS

Figure 1:
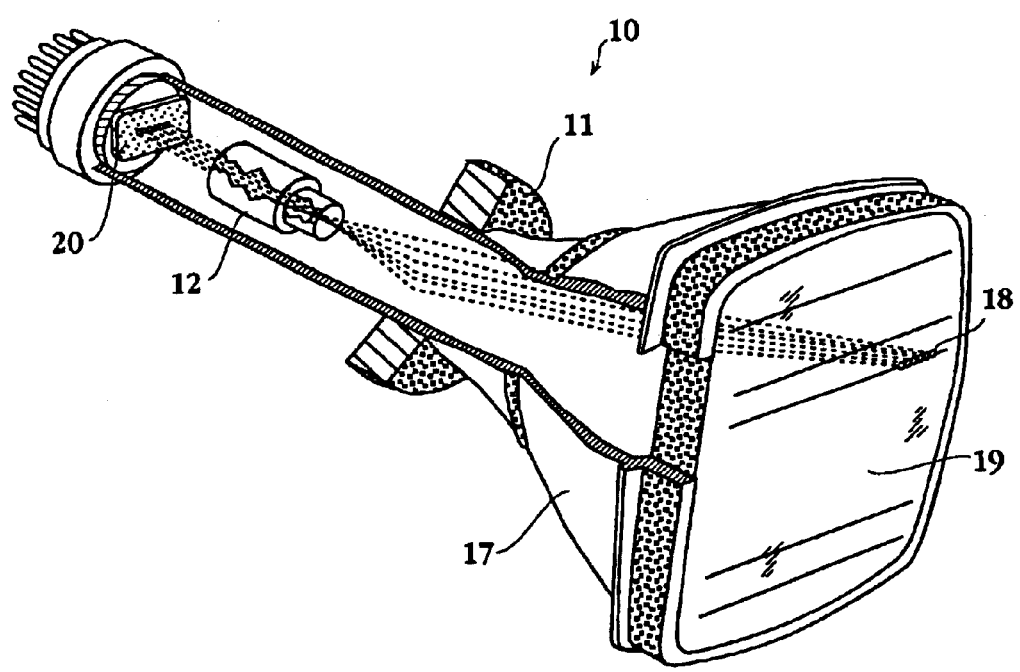
FIG. 1 shows the top view of a cathode ray tube having a multi-element field emission cathode.

Referring to FIG. 1, the top view of a cathode ray tube having a field emission cathode is shown generally at 10. Multi-element field emission cathode 20 is at the source end of electron gun assembly 12. Gun assembly 12 is located inside the neck of envelope 17. Multi-element field emission cathode 20 will be described in more detail below. These electrodes comprising the gun assembly are operated at independent potentials such that electrons emitted from the plane of the cathode array are imaged on to phosphor screen 19. The electron gun elements combine to form the equivalent of a single optical lens that maps the electron field emission site at specific positions on the cathode array into an image of the array on the screen, modified only by the magnification of the electron optics and any aberration or other imperfections in the imaging. Methods for calculating such imaging of electron sources and electron beams are known, and are discussed, for example, in commonly assigned application U.S. Ser. No. 09/356,851, filed Jul. 19, 1999, which is hereby incorporated by reference herein. Since field emission is constrained to emanate from only the linear array of cathode elements, the electron optics reproduces this linear array on to screen 19. Multiple cathode elements in the linear array form a corresponding multitude of bright spots on the screen such as shown at 18.

Phosphor on the screen in a color CRT is normally divided into red, green and blue (RGB) dots. A phosphor dot is typically about 200 micrometers in diameter, but may be larger or smaller, depending on the resolution of the CRT. Higher resolution monitors for television or for other purposes may use smaller phosphor dots. Bright spots on phosphor dots correspond to spots 18 illustrated on phosphor screen 19. Deflection apparatus 11 is used to cause the electron beams to traverse the span of the screen in both horizontal and vertical directions, forming a rectangular video image for each full cycle of traversal. Color information is normally imparted to the image by the RGB phosphors in adjacent alternating spots or stripes on the inside of the CRT screen 19. Modulation of the electron beam current in a fashion that is synchronized with the color phosphor locations produces a color image.

Figure 2:
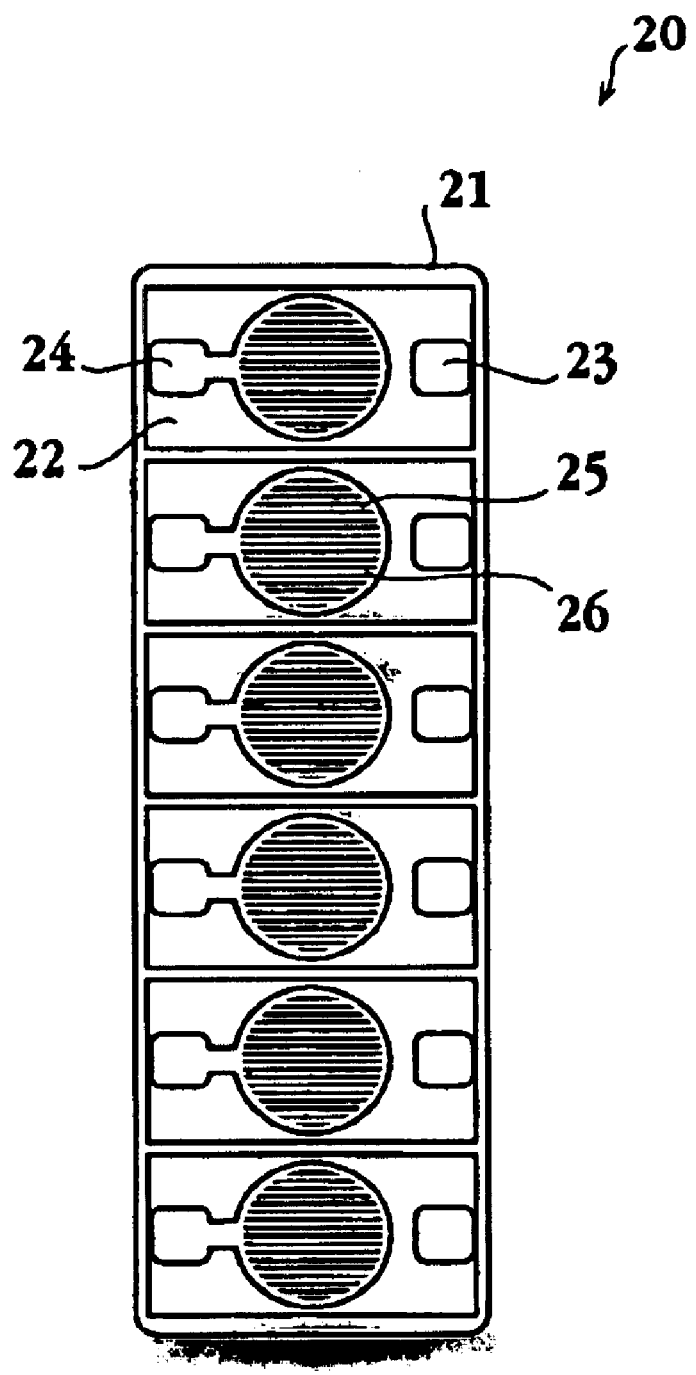
FIG. 2 shows the front view of a multi-element field emission cathode.

Referring to FIG. 2, a linear field emission array is generally shown at 20. The array may include individual cathode subassemblies 22 mounted on common carrier assembly 21. Each of the cathode subassemblies in the array includes two bond pads: field emitting material pad 23 and gate electrode pad 24. Electrons emitted by the field emitting material emanate from a plurality of individual sites 25 within active area 26 of the cathode subassembly. Any field emission array, including an array of Spindt tips, may be used according to the apparatus and methods disclosed here. A preferred field emitting array is formed from a carbon based material disclosed in U.S. Ser. No. 169,908, filed Oct. 12, 1998 and U.S. Pat. No. 6,181,055B1, referenced above, each of which is incorporated by reference herein. The emission current from each cathode subassembly is controlled by application of voltage between contacts or bond pads 23 and 24, with emission current increasing with increasing positive voltage on gate electrode 24 with respect to field emitting material pad 23. The spacing between the individual active areas of each cathode subassembly 22 is precisely controlled during assembly. During operation, the field emission current from each of cathode subassemblies 22 is independently controlled, forming distinct electron beams that propagate in a direction normal to the plane of cathode 20. The diameter of each active area 26 is normally in the range of about 10 to about 100 micrometers, but larger or smaller active areas may be used. The smaller area will be limited by the number of active emitters within each area and larger area will be limited by the total span of the multiple cathodes. The length of subassembly 22 is typically in the range of about 70 micrometers, but it may be larger or smaller. Preferably six active areas are used as a cathode in a color CRT. Any number of active areas may be used, limited by the total overall dimension and the ability to image extended sources.

Figure 3A:
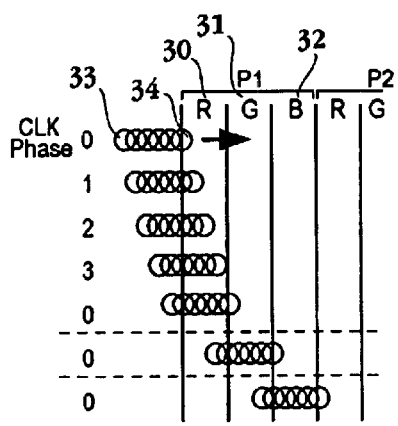
FIG. 3 shows a diagram of a horizontal sweep across a CRT screen illustrating variations in electron beam current with clock signals.
Figure 3B:
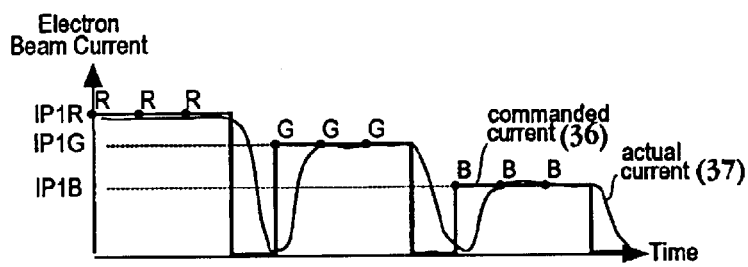

FIG. 3(a) illustrates images of the active areas of cathode subassemblies as they would appear on the screen of a CRT. The individual electron beams may impinge upon the phosphor in a set of overlapping regions, with each beam creating a luminous spot on the CRT screen that has the hue of the corresponding phosphor material and a luminosity proportional to the value of electron beam current. Variations of electron beam current as the beam is swept across the screen of a CRT are illustrated in FIG. 3(b). The array of overlapping regions is oriented in the same direction (shown to be horizontal) as the array of cathode subassemblies on the field emission cathode. There may be a 1:1 correspondence between the dimensions of the cathode emission areas 26 and the overlapping regions on the screen, or the dimensions of the cathode may be changed by an overall magnification factor. The cathode images may also exhibit blurring or other aberration from the electron optics. For example, the stripes of red, green and blue phosphor as shown in FIG. 3 may have widths of about 50–100 microns. The image of the cathode subassemblies 34 may have a diameter in the range of about 25–50 microns. Preferably, the spot diameter is about one-half of the phosphor stripe width. Smaller spot sizes are more expensive to produce and the corresponding higher bandwidths required for current modulation is more expensive as well. In the present invention, the deflection apparatus causes the array of overlapping electron beams to traverse the surface of the screen together, each beam exciting the phosphor it impinges upon proportionally to that beam's current. The beam strikes red phosphor 30, green phosphor 31 and blue phosphor 32, which may be arranged in vertical stripes. If the individual electron beam's impingement area 33 is approximately half the width of the phosphor stripe, and the modulation of the electron beam's current is controlled precisely in synchronization with the horizontal deflection apparatus, then an embodiment of a color CRT is realized.

Figure 3C:
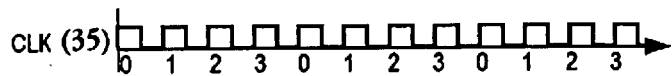

FIGS. 3(b) and 3(c) illustrate clock signal 35 and electron beam current 37, which corresponds to movement of the electron beam across stripes of phosphor as shown in FIG. 3A. Following the array of electron beams through a horizontal sweep across the CRT screen, at time zero, defined by the rising edge of a clock signal 35 (FIG. 3(c)), first beam 34 (FIG. 3(a)) is positioned at the boundary of the red phosphor stripe 30. At this instant, the first electron beam's current is selected to assume a value proportionate to the red component of the first picture element in the current horizontal scan line, $I_{PIR}$. All of the other electron beams may be selected to have zero current. Later, at time 1, defined by the second rising edge of clock signal 35, the array of electron beams has moved together a distance of one-half an individual beam width. This causes the first electron beam to move fully into the red phosphor stripe and it is still commanded to output current $I_{PIR}$. The second electron beam is now also commanded to output current $I_{PIR}$. After another clock increment, at time 2, the third electron beam is commanded to output current $I_{PIR}$, along with the first and second electron beams. At clock phase 3, shown in FIG. 3(a), the edge of the first electron beam has reached the boundary between the red and green phosphor and is commanded to zero current, while the second, third and now fourth electron beams are commanded to current $I_{PIR}$. At the beginning of the next time interval, the first electron beam is centered on the boundary between red and green phosphors and is now commanded to current $I_{PIG}$, the current proportional to the green component of the first picture element's luminosity. The time is denoted time zero or clock phase zero again, because it marks the beginning of a four-period interval in which the first electron beam is commanded to a selected current, at the end of which its current is commanded to a value of zero.

It should be clear that for the preferred spot size 12 periods of clock phase are required for each picture element, 4 periods for each phosphor color, and that during 3 of those periods the electron beam is commanded to emit a non-zero current. Because of the finite bandwidth of the video driver and cathode combination, the actual electron beam current 37 will lag the commanded value of current 36 (FIG. 3(*b*)) somewhat and will not be able to track the sharp transitions between the commanded values. The video bandwidth must be at least high enough so that the actual electron beam current falls to a small value somewhere in the interval between time 3 and the following time zero in order to minimize bleed-over between adjacent colors.

Figure 4:
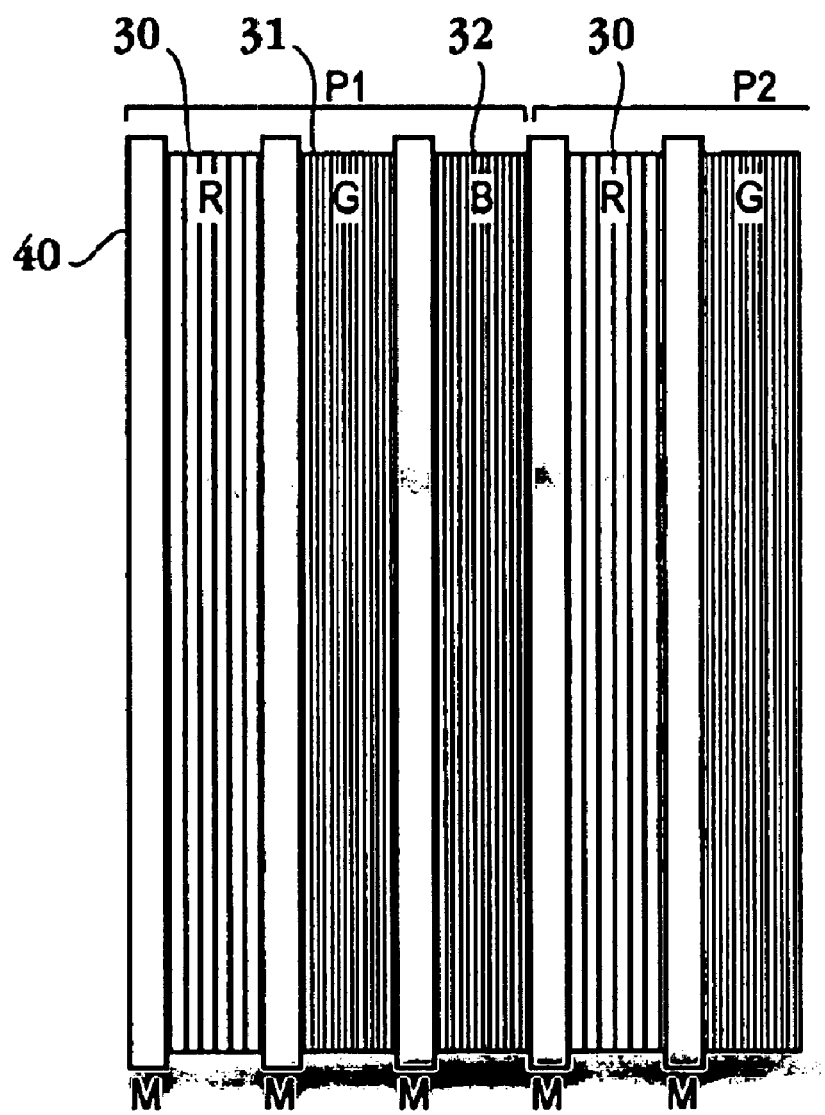
FIG. 4 shows a thin mask stripe deposited in the boundary between each phosphor stripe to increase color separation.

In another embodiment, shown in FIG. 4, thin mask stripe 40 is deposited at the boundary between each phosphor stripe 30, 31 and 32. Mask stripe 40 can be used to increase color separation and further decrease bleed-over between adjacent colors. Stripe 40 may be produced lithographically, using standard techniques. It may be formed of a metal. It may be laid down at the same time the phosphor is deposited. The width of stripe 40 will be related to the bandwidth of the video and preferably will be approximately one-half the distance that is required to turn off the electron beam at sweep velocity.

Figure 5A:
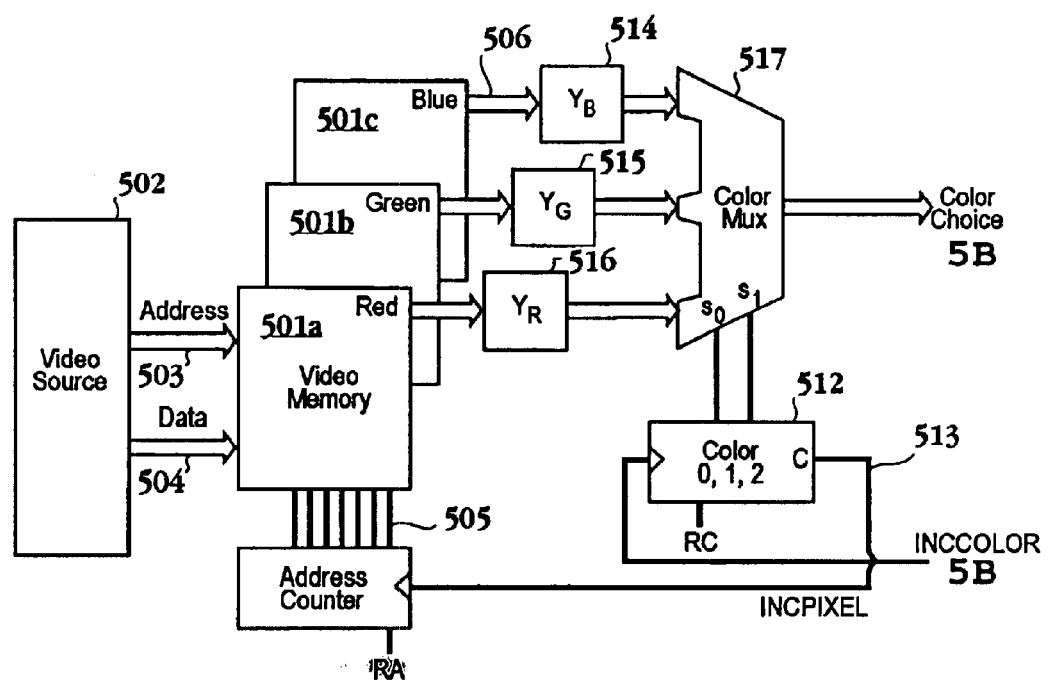
FIGS. 5(a) and 5(b) show a diagram of an electronic circuit to accomplish the timing of an electron beam to create a color image.
Figure 5B:
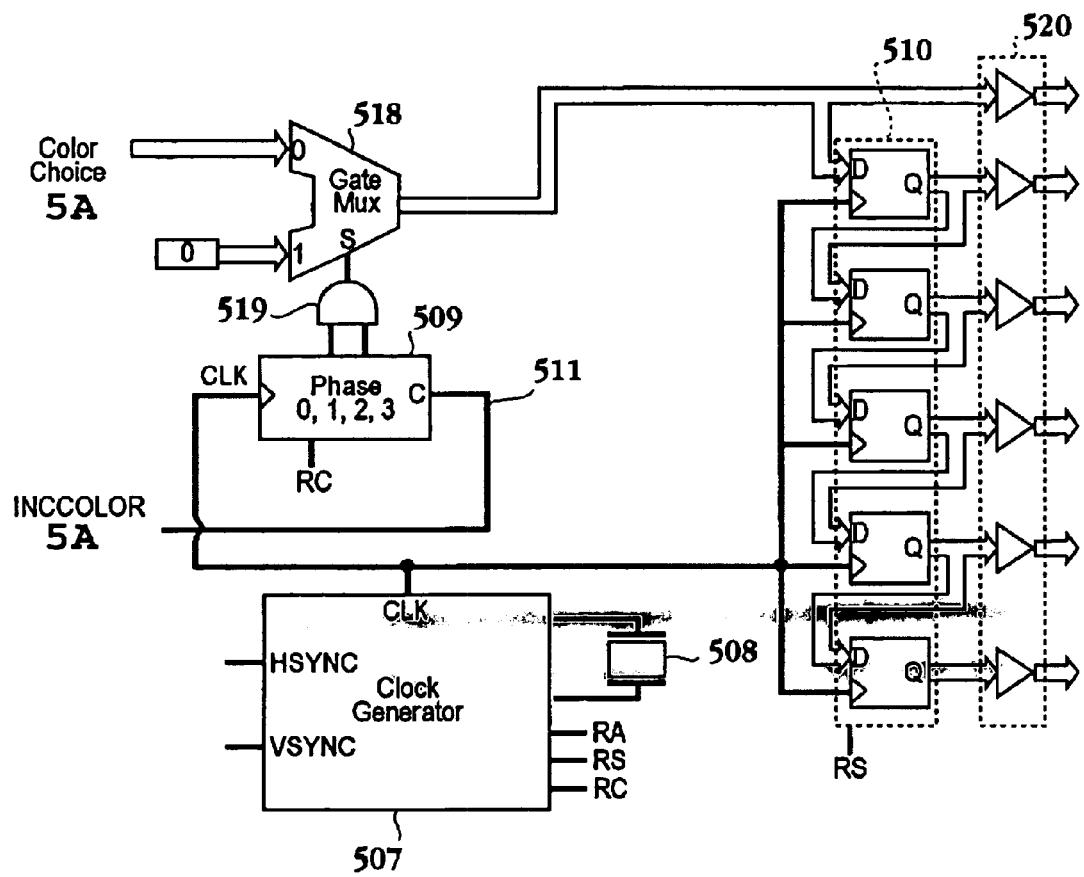

An electronic circuit to accomplish the timing of the electron beams from multi-element cathode 20 of FIG. 1 is shown in FIGS. 5(*a*) and 5(*b*). The information required to create the color image may be contained in three banks of video memory 501*a,* 501*b,* and 501*c,* corresponding to the red, green, and blue components of the image, respectively. In each bank of memory, there is a memory location, corresponding to each picture element displayed on the screen, that contains a digital value representing the intensity of the particular color of the particular picture element, i.e., color picture element intensity. Generally, video picture information is stored into the memory from a video source (502) at a rate that may or may not be synchronized with the display rate, though address (503) and data (504) signals may be separate from those used for the display (505 and 506). Clock generator 507 (FIG. 5(*b*)) is used to generate the overall timing signals necessary to drive the display, including the horizontal and vertical synchronization pulses for the deflection drivers and the source of the video master clock (CLK). The frequency of the clock generator is controlled by quartz crystal 508 to ensure the accurate interval timing necessary for synchronization.

The CLK signal from the clock generator 507 is supplied to a divide-by-four counter 509 having carry output 511 and also to word shift register 510, which comprises five load registers. The divide-by-four counter 509 counts in succession values 0–3, in time with four successive clock pulses, before resetting to 0 and outputting carry signal 511 on line INCCOLOR. The divide-by-four counter counts 0–3, denoted by PHASE; 0, 1, 2, and 3 correspond to the respective CLK intervals in FIG. 3. The INCCOLOR signal is input to divide-by-three counter 512 that counts 0–2 before resetting to 0 and out-putting a carry signal 513 on line INCPIXEL. The state of the divide-by-three counter, denoted by COLOR, is fed to 1-of-3 digital word multiplexer 517, which is used to select one of the three color-related intensity values. These intensity values come from the three memory banks 501*a,* 501*b,* and 501*c,* one word for each color, and are individually gamma-corrected in word multipliers 516, 515, and 514. The specific picture element being displayed is selected by address counter 505, which is common to all three video memory banks 501*a,* 501*b,* 501*c.*

The output from color multiplexer 517 is fed to 2-of-1 multiplexer 518 that selects whether to simply pass the digital information through or to set it to zero, depending upon the state of the PHASE counter 509.

AND gate 519 switches the state of gate multiplexer 518 only when the PHASE counter is in state 3, which provides the means for turning off the electron beam when it crosses a phosphor color-boundary. The output of gate multiplexer 518 is the digital intensity word for the first electron beam. This digital value is sent to digital-to-analog converter 520, which comprises six digital-to-analog converter modules. The first module of digital-to-analog converter 520 converts the digital command into a voltage 521 that is used to control the gate electrode of the cathode subassembly for electron beam one. The second module of digital-to-analog converter 520 is connected to the first load register of shift register 510, the third module connected to the second load register, and so on. Every rising edge of the CLK signal causes the shift register 510 to shift the digital command for electron beam one into the signal that carries the digital command for electron beam two. Similarly, beam two's command is shifted to beam three, and so on. The net effect is that as the linear array of electron beams traverse the CRT screen, the commanded value for a given phosphor stripe in a given picture element is supplied to whichever electron beam is currently illuminating that phosphor stripe.

Reset signals are used to start the electronics in a known state at the beginning of each vertical frame and each horizontal sweep line. Signal RA (FIG. 5*a*) is generated to reset the video memory address at the beginning of a frame. Signal RS (FIG. 5*b*) resets and clears all of the digital outputs in the shift register 510 prior to a horizontal sweep. Signal RC (FIG. 5*a*) resets the PHASE 509 and COLOR 512 counters to state 0 at the beginning of each horizontal line.

The disclosed CRT has increased brightness because of the multiple sources of electron beams and the lack of a shadow mask. The field emission cathodes can be energized instantaneously, and the color convergence adjustment is based solely on electronic timing. The small field emission cathodes have smaller capacitance and thus a higher video bandwidth capability than the thermionic cathodes of conventional CRTs. This allows the electron beams to be turned on and off faster when crossing phosphor boundaries. This will decrease the need for a shadow mask in the CRT, which is expensive to install during manufacture. According to the present disclosure, phosphor can be printed directly onto the inside face of the CRT screen 19 (FIG. 1), instead of being deposited in precise alignment with a shadow mask. The multiple electron beams means that each separate beam can have a smaller current and the viewer sees the effect of the total current from all the beams. Thus, each cathode is smaller and has a lower capacitance. Failure of a small number of cathode subassemblies results in an overall intensity decrease of 1/N, where N is the total number of cathodes in the assembly.

In one embodiment, dynamic beam focus during sweep is employed. In another embodiment, dynamic timing adjustment is employed at large deflection angles.

Methods for beam adjustment using distortion correction circuits are well known, and are described, for example, in the book *Video Engineering,* by A. Luther et al, Mc-Graw-Hill, 1999, pp. 5–39 through 5.45, which are hereby incorporated by reference.

While preferred embodiments of the invention have been described, it should be understood that one of ordinary skill in the art may recognize other embodiments of the invention, and that the invention is limited only by the appended claims.

What is claimed is:

1. A multi-element field emission cathode, comprising:

a common carrier assembly; and a plurality of sub-assemblies on the common carrier assembly, each sub-assembly having a field emission array, the array having a selected area, wherein each array is associated with corresponding first and second electrical bond pads for independently controlling emission current from each array.

2. The field emission cathode of claim 1 wherein the field emission array is comprised of carbon-based emitters.

3. The field emission cathode of claim 1 wherein the selected area of the array is circular, the area having a diameter in the range from about 10 micrometers to about 100 micrometers.

4. The field emission cathode of claim 1 wherein the width of a sub-assembly is approximately 70 micrometers.

5. The field emission cathode of claim 1 wherein the number of sub-assemblies mounted on the common carrier assembly is in the range from four to ten.

6. The field emission cathode of claim 1 wherein the number of sub-assemblies mounted on the common carrier assembly is six.

7. The field emission cathode of claim 1, wherein the first electrical bond pad is a field emitting material pad and the second electrical bond pad is a gate electrode pad.

8. The field emission cathode of claim 1, wherein the field emission cathode is incorporated into a cathode ray tube.

9. The field emission cathode of claim 8, wherein the cathode ray tube includes a phosphor screen, the phosphor screen having red, blue, and green phosphor stripes, each of the stripes separated by a mask stripe.

10. The field emission cathode of claim 9, wherein the mask stripe is composed of metal.

11. The field emission cathode of claim 9, wherein the mask stripe has a width that is equal to one half the distance required to turn off an electron beam emitted from the field emission cathode at sweep velocity.

* * * * *